United States Patent
Emara et al.

(10) Patent No.: US 8,090,969 B2
(45) Date of Patent: Jan. 3, 2012

(54) METHOD AND APPARATUS FOR MANAGING POWER CONSUMPTION RELATING TO A DIFFERENTIAL SERIAL COMMUNICATION LINK

(75) Inventors: Salem Emara, Richmond Hill (CA); Joel D. Wilke, Toronto (CA); William W. L. Hui, Richmond Hill (CA); Wen-Chia Liu, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 949 days.

(21) Appl. No.: 11/847,151

(22) Filed: Aug. 29, 2007

(65) Prior Publication Data

US 2009/0061918 A1 Mar. 5, 2009

(51) Int. Cl.
*G06F 1/32* (2006.01)
(52) U.S. Cl. ............ 713/324; 713/320; 713/323
(58) Field of Classification Search ........... 713/300–324
See application file for complete search history.

(56) References Cited

U.S. PATENT DOCUMENTS

| 6,560,240 | B1 | 5/2003 | Borland et al. |
| 7,426,598 | B2 * | 9/2008 | Kwa et al. ............ 710/307 |
| 2003/0158991 | A1 * | 8/2003 | Deyring et al. ........ 710/305 |
| 2006/0023633 | A1 | 2/2006 | Caruk et al. |
| 2008/0209246 | A1 * | 8/2008 | Marks et al. ............ 713/323 |
| 2008/0288798 | A1 * | 11/2008 | Cooper et al. ............ 713/322 |

OTHER PUBLICATIONS

Bhatt, Ajay V,; Creating a Third Generation I/O Interconnect; Desktop Architecture Labs, Intel Corporation (2002); downloaded from www.pciexpressdevnet.org/downloads/3rdGenWhitePaper.pdf on Aug. 29, 2007.

* cited by examiner

*Primary Examiner* — Dennis M Butler
(74) *Attorney, Agent, or Firm* — Baker & Daniels LLP

(57) ABSTRACT

A circuit includes a primary transceiver, a secondary transceiver, and control logic. The primary transceiver communicates information via a primary communication link. The secondary transceiver communicates information via a secondary communication link. The control logic is operatively coupled to the primary and secondary transceivers. The control logic selectively powers down the primary transceiver based on primary communication link traffic trigger information and causes communication using the secondary transceiver instead of the primary transceiver based on the primary communication link traffic trigger information.

32 Claims, 5 Drawing Sheets

METHOD AND APPARATUS FOR MANAGING POWER CONSUMPTION RELATING TO A DIFFERENTIAL SERIAL COMMUNICATION LINK

FIELD

The present disclosure generally relates to differential serial communication circuits, and more particularly, to a method and apparatus for reducing power consumption of differential communication circuits.

BACKGROUND

Reducing power consumption of integrated circuits and systems continues to be a difficult but necessary task particularly for integrated circuits used in mobile devices such as laptop devices, handheld devices and other mobile and non-mobile devices. In addition, advances in technology create an increased demand for power consumption in order implement performance improvements afforded by the advances in technology. In many instances, the performance needs of applications implemented by the integrated circuits are variable depending on the context of the application. For example, integrated circuits used for communicating between a bridge circuit and a high speed I/O device such as a graphics processor, hard disk, network card, and/or other high speed I/O device can exploit periods of low demand for bandwidth to reduce power consumption.

A differential serial communication link having multiple lanes, such a PCI Express™ communication link or other suitable differential communication links, is particularly variable in terms of bandwidth demands required for the application. There are known methods for scaling the bandwidth through lane width sizing and/or powering down the differential serial communication link. However, for low bandwidth demands, the interface has to power up completely and run at a full clock rate before powering down after a period of inactivity. If the low bandwidth demands are frequent enough, the link may never have a chance to power down. It is therefore desirable to provide a method and apparatus to further reduce power consumption when bandwidth demands are low in a differential serial communication link.

In one method, power may be reduced on each active lane to multiple different power levels. As such, once the lane width has been determined after power on, the lane width stays the same but different power states may be used such as L0, which may be for example an 80 milliwatt mode, L0s which may be for example a 20 milliwatt mode, L1, which may be a 5 milliwatt mode and L2 or L3 which may be a mode that may consume less than 1 milliwatt of power. It would be desirable to provide further power savings in such systems.

Accordingly, a need exists for a method and apparatus to further reduce power consumption in connection with a differential serial communication link.

BRIEF DESCRIPTION OF THE DRAWINGS

The invention will be more readily understood in view of the following description when accompanied by the below figures, wherein like reference numerals represent like elements.

DETAILED DESCRIPTION

Figure 1:
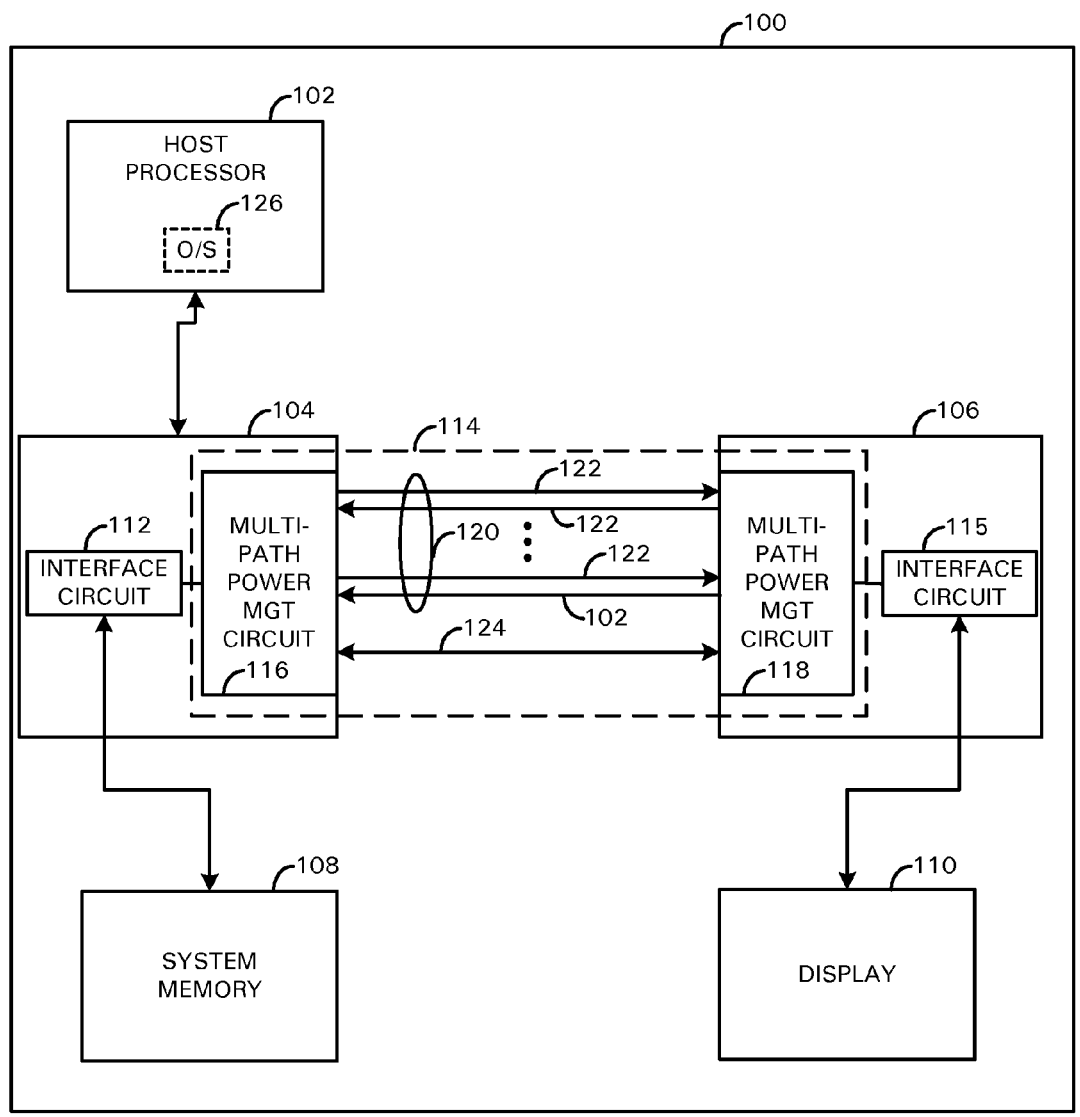
FIG. 1 is an exemplary functional block diagram of a device that includes a multipath power management communication system.

In one example, a circuit includes a primary transceiver, a secondary transceiver, and control logic. The primary transceiver communicates information via a primary communication link. The secondary transceiver communicates information via a secondary communication link. The control logic is operatively coupled to the primary and secondary transceivers. The control logic selectively powers down the primary transceiver based on primary communication link traffic trigger information. The primary communication link traffic trigger information indicates a bandwidth demand requirement for the primary transceiver to communicate information via the primary communication link. The control logic also causes communication using the secondary transceiver instead of the primary transceiver based on the primary communication link traffic trigger information. In one example, the control logic powers down the secondary transceiver when the primary transceiver is powered back up based on the primary communication link traffic trigger information. A related method is also disclosed.

The circuit and method provide, among other advantages, reduced power consumption during periods of low bandwidth demand without adversely affecting performance improvements afforded by other advances in technology that require increased bandwidth. As such, the method and apparatus provide additional bandwidth when the demand for bandwidth is increased. Other advantages will be recognized by those of ordinary skill in the art.

In one example, the secondary transceiver consumes less power than the primary transceiver when communicating the information. In one example, the secondary communication link has a bandwidth less than the primary communication link.

In one example, an apparatus includes a primary communication link, a secondary communication link, and control logic. The primary communication has a first bandwidth. The secondary communication link has a second bandwidth that is less than the first bandwidth. The control logic is operatively coupled to the primary and secondary communication links. The control logic selectively powers down the primary communication link and causes communication using the secondary communication link instead of the primary communication link based on a primary communication link traffic trigger information.

In one example, the primary communication link has multiple power states. The control logic detects whether the primary communication link is operating in a lowest of the multiple power states that still allows transmission of information across the link. The control logic powers down the primary communication link and causes communication using the secondary communication link when the primary communication link is operating in the lowest of the multiple power states.

In one example, the control logic powers down the secondary communication link when the primary communication link is powered up based on the primary communication link trigger information.

In one example, the control logic selectively powers up the primary communication link and causes communication using the primary communication link instead of the secondary communication link.

In one example, the secondary communication link traffic consumes less power than the primary communication link when communicating the information.

In one example, a device includes a display, memory, the primary communication link, the secondary communication link, and the control logic. The primary communication link is operatively coupled to the display and the memory. The secondary communication link is operatively coupled to the display and the memory. The control logic selectively powers down the primary communication link and causes communication between the display and memory using the secondary communication link instead of the primary communication link based on a primary communication link traffic trigger information.

As used herein, the terms "module," "circuit," and/or "device" can include an electronic circuit, one or more processors (e.g., shared, dedicated, or group of processors such as but not limited to microprocessors, DSPs, or central processing units), and memory that execute one or more software or firmware programs, combinational logic circuits, an ASIC, and/or other suitable components that provide the described functionality. Unless otherwise stated, the term "power down" refers to removing (or lowering) the source power of a "module," "circuit," and/or "device" rendering it inoperative. In addition, the term "power up" refers to adding (or increasing) the source power of a "module," "circuit," and/or "device" rendering it operative.

Referring now to FIG. 1, an exemplary functional block diagram of a device 100 such as a wireless phone, a mobile and/or stationary computer, a printer, a LAN interface (wireless and/or wired), a media player, a video decoder and/or encoder, and/or any other suitable digital device is depicted. The device 100 includes at least one processor 102, a bridge circuit 104 such a bridge circuit to memory and/or an I/O device, and a high speed I/O device 106 such as a graphics processor (or core), a hard disk, a network card, or other suitable high speed I/O device.

The processor 102 is operatively coupled to the bridge circuit 104 and processes requests from the bridge circuit 104. The bridge circuit 104 includes an interface circuit 112 that is operatively coupled to, for example, system memory 108. The system memory 108 stores information communicated from the bridge circuit 104 via the interface circuit 112. The bridge circuit 104 and the highspeed I/O device 106 communicate via a multipath power management communication system 114. The highspeed I/O device 106 includes an interface circuit 115 to communicate information received from the multipath power management communication system 114 to, for example, a display 110.

The multipath power management communication system 114 includes a first multipath power management communication circuit 116 and a second multipath power management communication circuit 118. In some embodiments, the multipath power management communication circuits 116, 118 can each be implemented as a respective integrated circuit. The multipath power management communication circuits 116, 118 selectively communicate using a primary communication link 120 having multiple lanes 122 and a secondary communication link 124.

The primary communication link 120 can be any suitable differential serial communication link having multiple lanes such a PCI Express™ communication link. The secondary communication link 124 is a low power, low clock speed, low bandwidth, minimal wire communication link such as an I²C communication link or any other suitable low power, low clock speed, low bandwidth, minimal wire communication link. As such, the secondary communication link 124 has a bandwidth that is less than the primary communication link 120 and consumes less power than the primary communication link 120 when communicating information.

During operation, the multipath power management communication circuits 116, 118 selectively power down the primary communication link 120 and communicate via the secondary communication link 124 based on a primary communication link traffic trigger in order to minimize power consumption. The primary communication link traffic trigger information indicates bandwidth demand for the multipath power management communication circuits 116, 118 to communicate. For example, if the demand for bandwidth is 100 Kbits/s or less, the multipath power management communication circuits 116, 118 can power down the primary communication link 120 and communicate via the secondary communication link 124. Although 100 Kbits/s is used in this example, skilled artisans will appreciate that other bandwidth values may be used.

Prior to powering down the primary communication link 120, the multipath power management communication circuits 116, 118 verify that traffic across the primary communication link 120 has subsided. For example, the multipath power management communication circuits 116, 118 can determine whether the traffic has subsided by inspecting an amount of unused flow control credits, which are commonly used in the art to control traffic.

In some embodiments, the secondary communication link 124 can be powered down when the primary communication link 120 is powered up to further minimize power consumption. Therefore, in these embodiments, the secondary communication link 124 is powered up prior to the multipath power management communication circuits 116, 118 communicating via the secondary communication link 124. In addition, prior to powering down the secondary communication link 124, the multipath power management communication circuits 116, 118 verify that traffic across the secondary communication link 124 has subsided. For example, the second multipath power management communication circuit 118 can send a read request to the first multipath power management communication circuit 116 and can determine that traffic has subsided when the second multipath power management communication circuit 118 receives a response to the read request.

The multipath power management communication circuits 116, 118 also selectively power up the primary communication link 120 and communicate via the primary communication link 120 instead of the secondary communication link 124 based on the primary communication link traffic trigger in order accommodate increased bandwidth demands. For example, if the demand for bandwidth is 100 Kbit/s or more, the multipath power management communication circuits 116, 118 can power up the primary communication link 120 and communicate via the primary communication link 120. Although 100 Kbits/s is used in this example, skilled artisans will appreciate that other bandwidth values may be used.

To further minimize power consumption, the secondary communication link 124 can be powered down when the primary communication link 120 is powered up. As previously noted, the multipath power management communication circuits 116, 118 verify that traffic across the secondary communication link 124 has subsided prior to powering it down.

In some embodiments, the primary communication link traffic trigger can be based on an amount of traffic across the primary communication link 120. For example, when the amount of traffic across the primary communication link 120 is less than a predetermined traffic threshold such as, for example 100 Kbit/s, the primary communication link 120 can be powered down and the multipath power management communication circuits 116, 118 can communicate via the secondary communication link 124. When the amount of traffic across the secondary communication link 124 is greater than the predetermined traffic threshold, the primary communication link 120 can be powered up and the multipath power management communication circuits 116, 118 can communicate via the primary communication link 120 instead of the secondary communication link 124.

In other embodiments, the primary communication link 120 can operate in multiple power states. For example, different power states may be used such as L0, which may be for example an 80 milliwatt mode, L0s which may be for example a 20 milliwatt mode, L1, which may be a 5 milliwatt mode and L2 or L3 which may be a mode that may consume less than 1 milliwatt of power. In these embodiments, the primary communication link traffic trigger can be based on the power level of the primary communication link 120. For example, if the primary communication link 120 is operating in a lowest of the multiple power states, the multipath power management communication circuits 116, 118 can power down the primary communication link 120 and communicate via the secondary communication link 124. If the primary communication link 120 is operating in a power state other than the lowest, the secondary communication link 124 can be powered down and the multipriority power management communication circuits 116, 118 can communicate via the primary communication link 120.

In still other embodiments, the primary communication link traffic trigger can be based on whether instructions of an operating system 126 executed by the processor 102 commands at least one other circuit (not shown) of the device 100 to operate in a power save (e.g., sleep or hibernate) mode. For example, when the other circuit is operating in the power save mode, the multipath power management communication circuits 116, 118 can power down the primary communication link 120 and communicate via the secondary communication link 124. When the other circuit is not operating in the power save mode, the primary communication link 120 can be powered up and the multipath power management communication circuits 116, 118 can communicate via the primary communication link 120 instead of the secondary communication link 124.

Figure 2:
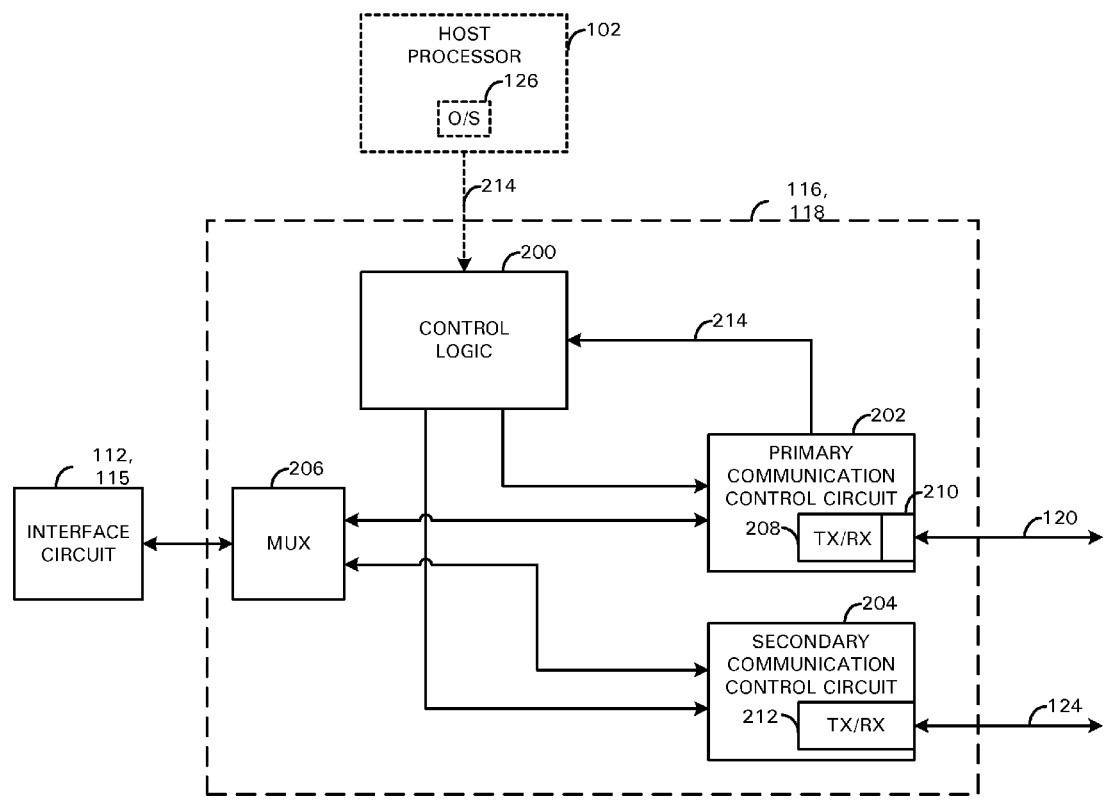
FIG. 2 is an exemplary functional block diagram of a multipath power management communication circuit.

Referring now to FIG. 2, an exemplary functional block diagram of the multipath power management communication circuit 116, 118 is depicted. The multipath power management communication circuit 116, 118 includes control logic 200 (e.g., a control module including logic that performs the described functionality), a primary communication circuit 202, a secondary communication circuit 204, and a multiplexer 206. Although the control logic 200 is included in both multipath power management communication circuits 116, 118 in this example, some embodiments may include the control logic 200 only in the multipath power management communication circuit 116 while other embodiments may include the control logic 200 only in the multipath power management communication circuit 118.

The primary communication circuit 202 controls various functions of the primary communication link 120 such as, for example, initializing lanes 122 of the primary communication link 120. Additional exemplary functions that the primary communication circuit 202 controls can be found in the PCI Express Base 2.0 Specification, January 2007, which is hereby incorporated by reference in its entirety. The secondary communication circuit 204 controls various functions of the secondary communication link 124 such as, for example, initialization of the secondary communication link 124. Additional exemplary functions that the secondary communication circuit 204 controls can be found in the $I^2C$-BUS Specification, Ver. 2.1, January 2000, which is hereby incorporated by reference in its entirety.

The primary communication circuit 202 includes a primary transceiver 208 and a buffer 210. The secondary communication circuit 204 includes a secondary transceiver 212. The primary transceiver 208 communicates information via the primary communication link 120. The secondary transceiver communicates information via the secondary communication link 124.

The multiplexer 206 communicates information between the interface circuit 112, 115 and the primary communication circuit 202 or the secondary communication circuit 204. For example, when the primary communication circuit 202 is powered up, the multiplexer 206 communicates information between the interface circuit 112, 115 and the primary transceiver 208 and when the primary communication circuit 202 is powered down the multiplexer 206 communicates information between the secondary transceiver 212 and the interface circuit 112, 115.

The control logic 200 selectively powers down the primary communication circuit 202 including the primary transceiver 208 and causes communication using the secondary transceiver 204 instead of the primary transceiver 202 based on a primary communication link traffic trigger information 214. Prior to powering down the primary communication circuit 202, the control logic 200 verifies that traffic across the primary communication link 120 has subsided. For example, the control logic 200 can determine whether the traffic has subsided by inspecting an amount of unused flow control credits, which are commonly used in the art to control traffic.

In some embodiments, the control logic 200 powers down the secondary communication circuit 204 including the secondary transceiver 212 when the primary communication circuit 202 including the primary transceiver 208 is powered up to further minimize power consumption. Therefore, in these embodiments, the secondary transceiver 204 is powered up prior to communicating via the secondary transceiver 204. In addition, prior to powering down the secondary communication circuit 204, the control logic 200 verifies that traffic across the secondary communication link 124 has subsided. For example, the control logic 200 can control the secondary transceiver 212 to send a read request across the secondary communication link 124 and can determine that traffic has subsided when the secondary transceiver 212 receives a response to the read request.

The control logic 200 selectively powers up the primary communication circuit 202 including the primary transceiver 208 based on the primary communication link traffic trigger information 214. The control logic 200 also causes the primary transceiver 208 to communicate via the primary communication link 120 instead of the secondary transceiver 212 communicating via the secondary communication link 124 based on the primary communication link traffic trigger information 214 in order to accommodate increased bandwidth demands.

In some embodiments, the control logic 200 can receive the primary communication link traffic trigger information 214 from the primary communication circuit 202. As previously noted, the primary communication link traffic trigger information 214 can be based on an amount of traffic across the primary communication link 120. For example, when the buffer 210 receives information via the primary communication link 120 without transcending a predetermined capacity threshold of the buffer 210 such as 75% of the total capacity of the buffer 210, the primary communication link traffic trigger information 214 indicates that the amount of traffic across the primary communication link 120 is less than the predetermined traffic threshold. However, when the buffer 210 transcends the predetermined capacity threshold, the primary communication link traffic trigger information 214 indicates that the amount of traffic across the primary communication link 120 is greater than the predetermined traffic threshold.

In other embodiments, the primary communication circuit 202 can operate in multiple power states. In these embodiments, the control logic 200 can receive the primary communication link traffic trigger information 214 from the primary communication circuit 202. For example, different power states may be used such as L0, which may be for example an 80 milliwatt mode, L0s which may be for example a 20 milliwatt mode, L1, which may be a 5 milliwatt mode and L2 or L3 which may be a mode that may consume less than 1 milliwatt of power. In these embodiments, the primary communication link traffic trigger can be based on the power level of the primary communication circuit 202. For example, if the primary communication circuit 202 is operating in a lowest of the multiple power states, the control logic 200 can power down the primary communication circuit 202 including the primary transceiver 208 and cause communication using the secondary transceiver 212. If the primary communication circuit 202 is operating in a power state other than the lowest, the control logic 200 can power up the primary communication circuit 202 including the primary transceiver 208 and cause communication using the primary transceiver 208 instead of the secondary transceiver 212.

In still other embodiments, the control logic 200 can receive the primary communication link traffic trigger information 214 from instructions of the operating system 126 executed by the processor 102. In these embodiments, the primary communication link traffic trigger information 214 can be based on whether the operating system 126 commands at least one circuit such as, for example, the primary communication circuit 202 and/or any other suitable circuit of the device 100 to operate in a power save (e.g., sleep or hibernate) mode. When the operating system 126 commands the circuit to operate in the power save mode, the control logic 200 can power down the primary communication circuit 202 including the primary transceiver 208 and cause communication using the secondary communication transceiver 212. When the operating system 126 does not command the other circuit to operate in the power save mode, the control logic 200 can power up the primary communication circuit 202 and can cause communication using the primary transceiver 208 instead of the secondary transceiver 212.

Figure 3:
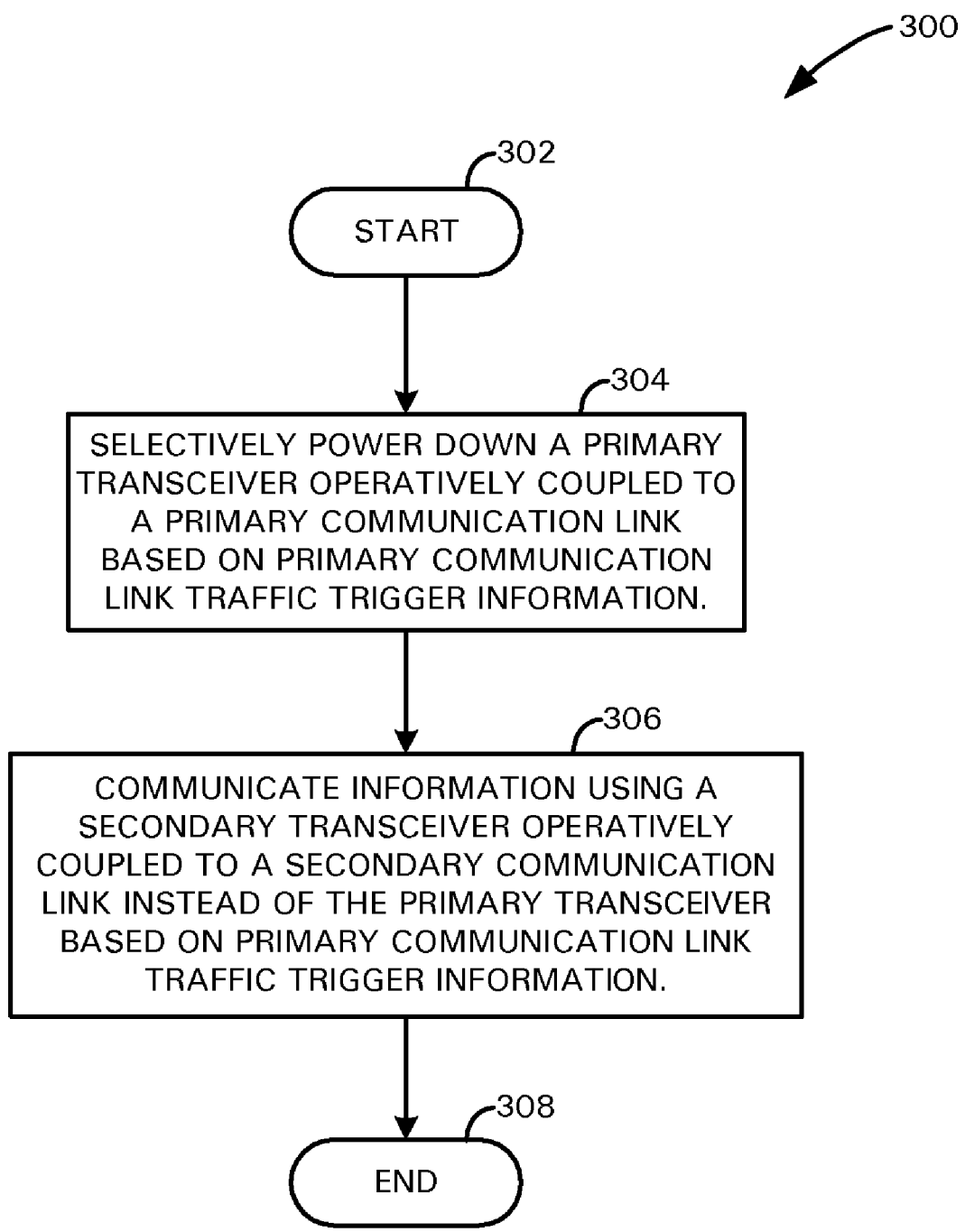
FIG. 3 is a flowchart depicting exemplary steps that can be taken by the multipath power management communication circuit.

Referring now to FIG. 3, exemplary steps that can be taken by the multipath power management communication circuit 116, 118 are generally identified at 300. The process starts in step 302 when the multipath power management communication circuit 116, 118 is powered on. In step 304, the control logic 200 selectively powers down the primary communication circuit 202 including the primary transceiver 208, which is operatively coupled to the primary communication link 120, based on the primary communication link traffic trigger information 214. In step 206, the control logic 200 causes the secondary transceiver 212, which is operatively coupled to the secondary communication link 124, to communicate information instead of the primary transceiver 208 based on the primary communication link traffic trigger information 214. The process ends in step 308.

Figure 4:
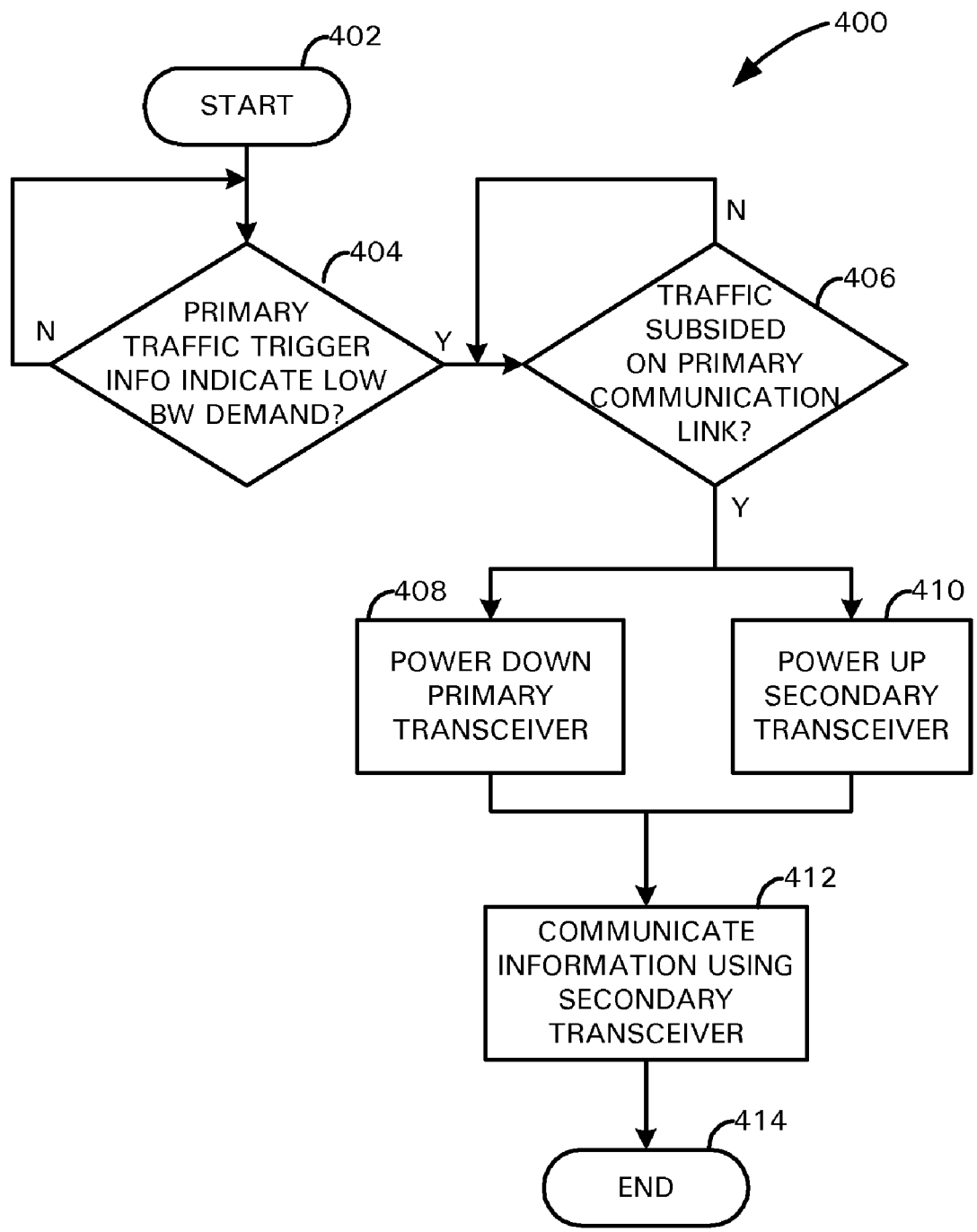
FIG. 4 is a flowchart depicting additional exemplary steps that can be taken by the multipath power management communication circuit.

Referring now to FIG. 4, additional exemplary steps that can be taken by the multipath power management communication circuit 116, 118 are generally identified at 400. The process starts in step 402 when the multipath power management communication circuit 116, 118 is powered on. In step 404, the control logic 200 determines whether the primary communication link traffic information 214 indicates a low bandwidth demand.

If the primary communication link traffic information 214 does not indicate a low bandwidth demand, the process returns to step 402. However, if the primary communication link traffic trigger information 214 does indicate a low bandwidth demand, the control logic 200 determines whether traffic across the primary communication link 120 has subsided in step 406.

If the traffic has not subsided, the process returns to step 406. However, if the traffic has subsided, the control logic 200 powers down the primary transceiver 208 in step 408 and powers up the secondary transceiver 212 in step 410. In step 412, the control logic 200 causes the multipath power management communication circuit 116, 118 to communicate information using the secondary transceiver 212 instead of the primary transceiver 208. The process ends in step 414.

Figure 5:
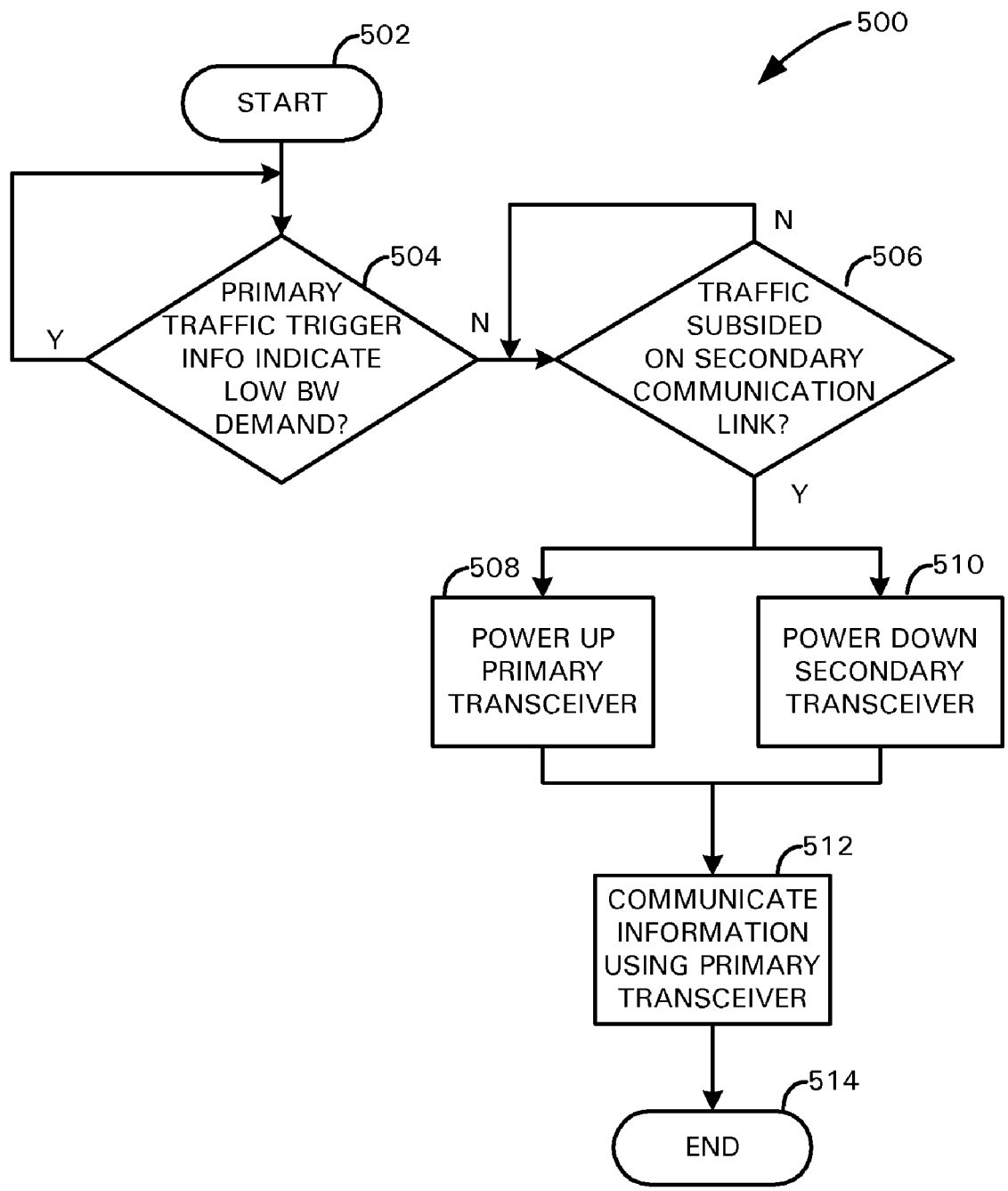
FIG. 5 is a flowchart depicting additional exemplary steps that can be taken by the multipath power management communication circuit.

Referring now to FIG. 5, additional exemplary steps that can be taken by the multipath power management communication circuit 116, 118 are generally identified at 500. The process starts in step 502 when the multipath power management communication circuit 116, 118 is powered on. In step 504, the control logic 200 determines whether the primary communication link traffic information 214 indicates a low bandwidth demand.

If the primary communication link traffic information 214 indicates a low bandwidth demand, the process returns to step 502. However, if the primary communication link traffic trigger information 214 does not indicate a low bandwidth demand, the control logic 200 determines whether traffic across the secondary communication link 124 has subsided in step 506.

If the traffic has not subsided, the process returns to step 506. However, if the traffic has subsided, the control logic 200 powers up the primary transceiver 208 in step 508 and powers down the secondary transceiver 212 in step 510. In step 512, the control logic 200 causes the multipath power management communication circuit 116, 118 to communicate information using the primary transceiver 208 instead of the secondary transceiver 212. The process ends in step 514.

As noted above, among other advantages, power consumption is further reduced during periods of low bandwidth demand without adversely affecting performance improvements afforded by other advances in technology that require increased bandwidth. As such, the method and apparatus provide additional bandwidth when the demand for bandwidth is increased. Other advantages will be recognized by those of ordinary skill in the art.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

What is claimed is:

1. A circuit, comprising:
a primary transceiver that is operative to communicate information via a primary multilane communication link;
a secondary transceiver that is operative to communicate information via a secondary communication link that is different from the primary multilane link; and
control logic, operatively coupled to the primary and secondary transceivers, that is operative to selectively power down the primary transceiver and cause communication using the secondary transceiver instead of the primary transceiver based on primary communication link traffic trigger information.

2. The circuit of claim 1 wherein the primary transceiver has multiple power states and wherein the control logic is operative to detect whether the primary transceiver is operating in a lowest of the multiple power states and to power down the primary transceiver and cause communication using the secondary transceiver when the primary transceiver is operating in the lowest of the multiple power states.

3. The circuit of claim 1 wherein the control logic is operative to power down the secondary transceiver when the primary transceiver is powered up based on the primary communication link traffic trigger information.

4. The circuit of claim 1 wherein the control logic is operative to selectively power up the primary transceiver based on the primary communication link traffic trigger information and cause communication using the primary transceiver instead of the secondary transceiver.

5. The circuit of claim 1 further comprising a multiplexer that is operative to communicate information from one of the first transceiver and the second transceiver to an interface circuit.

6. The circuit of claim 1 wherein the primary communication link traffic trigger information is based on an amount of traffic across the primary communication link.

7. The circuit of claim 1 wherein the primary communication link traffic trigger information is based on whether other circuits are operating in a power save mode.

8. The circuit of claim 1 wherein the secondary transceiver consumes less power than the primary transceiver when communicating the information.

9. The circuit of claim 1 wherein the secondary communication link has a bandwidth less than the primary communication link and a clock speed different than the primary communication link.

10. An apparatus, comprising:
a primary multilane communication link having a first bandwidth;
a secondary communication link having a second bandwidth that is less than the first bandwidth and that is different from the primary multilane link; and
control logic, operatively coupled to the primary and secondary communication links, that is operative to selectively power down the primary communication link and cause communication using the secondary communication link instead of the primary communication link based on a primary communication link traffic trigger information.

11. The apparatus of claim 10 wherein the primary communication link has multiple power states and wherein the control logic is operative to detect whether the primary communication link is operating in a lowest of the multiple power states and to power down the primary communication link and cause communication using the secondary communication link when the primary communication link is operating in the lowest of the multiple power states.

12. The apparatus of claim 10 wherein the control logic is operative to power down the secondary communication link when the primary communication link is powered up based on the primary communication link trigger information.

13. The apparatus of claim 10 wherein the control logic is operative to selectively power up the primary communication link and cause communication using the primary communication link instead of the secondary communication link.

14. The apparatus of claim 10 wherein the secondary communication link traffic consumes less power than the primary communication link when communicating the information.

15. A device, comprising:
a display;
memory;
a primary multilane communication link, having a first bandwidth, that is operatively coupled to the display and the memory;
a secondary communication link, having a second bandwidth that is less than the first bandwidth and that is different from the primary multilane link, operatively coupled to the display and the memory; and
control logic, operatively coupled to the primary and secondary communication links, that is operative to selectively power down the primary communication link and cause communication between the display and memory using the secondary communication link instead of the primary communication link based on a primary communication link traffic trigger information.

16. The device of claim 15 wherein the primary communication link has multiple power states and wherein the control logic is operative to detect whether the primary communication link is operating in a lowest of the multiple power states and to power down the primary communication link and cause communication using the secondary communication link when the primary communication link is operating in the lowest of the multiple power states.

17. The device of claim 15 wherein the control logic is operative to power down the secondary communication link when the primary communication link is powered up based on the primary communication link trigger information.

18. The device of claim 15 wherein the control logic is operative to selectively power up the primary communication link and cause communication using the primary communication link instead of the secondary communication link.

19. The device of claim 15 wherein the secondary communication link traffic consumes less power than the primary communication link when communicating the information.

20. A method of reducing power consumption of an apparatus, comprising:
selectively powering down a primary transceiver operatively coupled to a primary multilane communication link based on primary communication link traffic trigger information; and
communicating information using a secondary transceiver operatively coupled to a secondary communication link and that is different from the primary multilane link instead of the primary transceiver based on the primary communication link traffic trigger information.

21. The method of claim 20 wherein the primary transceiver has multiple power states and further comprising:
detecting whether the primary transceiver is operating in a lowest of the multiple power states; and powering down the primary transceiver and causing communication using the secondary transceiver when the primary transceiver is operating in the lowest of the multiple power states.

22. The method of claim 20 further comprising powering down the secondary transceiver when the primary transceiver is powered up based on the primary communication link traffic trigger information.

23. The method of claim 20 further comprising selectively powering up the primary transceiver based on the primary communication link traffic trigger information and causing communication using the primary transceiver instead of the secondary transceiver.

24. The method of claim 20 wherein the primary communication link traffic trigger information is based on an amount of traffic across the primary communication link.

25. The method of claim 20 wherein the primary communication link traffic trigger information is based on whether other circuits are operating in a power save mode.

26. The method of claim 20 wherein the secondary transceiver consumes less power than the primary transceiver when communicating the information.

27. The method of claim 20 wherein the secondary communication link has a bandwidth less than the primary communication link and a clock speed different than the primary communication link.

28. A circuit, comprising:
a primary transceiver that is operative to communicate information via a primary communication link;
a secondary transceiver that is operative to communicate information via a secondary communication link;
control logic, operatively coupled to the primary and secondary transceivers, that is operative to selectively power down the primary transceiver and cause communication using the secondary transceiver instead of the primary transceiver based on primary communication link traffic trigger information; and
wherein the control logic is operative to power down the secondary transceiver when the primary transceiver is powered up based on the primary communication link traffic trigger information.

29. A circuit, comprising:
a primary transceiver that is operative to communicate information via a primary communication link;
a secondary transceiver that is operative to communicate information via a secondary communication link;
control logic, operatively coupled to the primary and secondary transceivers, that is operative to selectively power down the primary transceiver and cause communication using the secondary transceiver instead of the primary transceiver based on primary communication link traffic trigger information; and a multiplexer that is operative to communicate information from one of the first transceiver and the second transceiver to an interface circuit.

30. An apparatus, comprising:
a primary communication link having a first bandwidth;
a secondary communication link having a second bandwidth that is less than the first bandwidth;
control logic, operatively coupled to the primary and secondary communication links, that is operative to selectively power down the primary communication link and cause communication using the secondary communication link instead of the primary communication link based on a primary communication link traffic trigger information; and
wherein the control logic is operative to power down the secondary communication link when the primary communication link is powered up based on the primary communication link trigger information.

31. A device, comprising:
a display;
memory;
a primary communication link, having a first bandwidth, that is operatively coupled to the display and the memory;
a secondary communication link, having a second bandwidth that is less than the first bandwidth, operatively coupled to the display and the memory;
control logic, operatively coupled to the primary and secondary communication links, that is operative to selectively power down the primary communication link and cause communication between the display and memory using the secondary communication link instead of the primary communication link based on a primary communication link traffic trigger information; and
wherein the control logic is operative to power down the secondary communication link when the primary communication link is powered up based on the primary communication link trigger information.

32. A method of reducing power consumption of an apparatus, comprising:
selectively powering down a primary transceiver operatively coupled to a primary communication link based on primary communication link traffic trigger information;
communicating information using a secondary transceiver operatively coupled to a secondary communication link instead of the primary transceiver based on the primary communication link traffic trigger information; and
powering down the secondary transceiver when the primary transceiver is powered up based on the primary communication link traffic trigger information.

\* \* \* \* \*